(12) United States Patent
Eiserer

(10) Patent No.: US 11,604,000 B2
(45) Date of Patent: *Mar. 14, 2023

(54) EVAPORATIVE COOLER

(71) Applicant: Rex A. Eiserer, Austin, TX (US)

(72) Inventor: Rex A. Eiserer, Austin, TX (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/079,670

(22) Filed: Oct. 26, 2020

(65) Prior Publication Data

US 2021/0108812 A1 Apr. 15, 2021

Related U.S. Application Data

(63) Continuation of application No. 16/132,110, filed on Sep. 14, 2018, now Pat. No. 10,830,463, which is a continuation of application No. 15/230,624, filed on Aug. 8, 2016, now Pat. No. 10,113,758.

(60) Provisional application No. 62/256,641, filed on Nov. 17, 2015.

(51) Int. Cl.
*F24F 6/04* (2006.01)
*F24F 5/00* (2006.01)

(52) U.S. Cl.
CPC .............. *F24F 6/04* (2013.01); *F24F 5/0035* (2013.01); *F24F 2006/046* (2013.01)

(58) Field of Classification Search
CPC ...... F24F 6/04; F24F 5/0035; F24F 2006/046; Y02B 30/54

See application file for complete search history.

(56) References Cited

U.S. PATENT DOCUMENTS

| | | | |
|---|---|---|---|
| 5,159,819 A | 11/1992 | Wong | |
| 5,497,633 A | 3/1996 | Jones | |
| 5,598,719 A | 2/1997 | Jones | |
| 5,921,101 A | 7/1999 | Wang | |
| 6,334,328 B1 | 1/2002 | Brill | |
| 6,571,568 B1* | 6/2003 | Link | B60H 1/3235 62/421 |
| 7,188,489 B2 | 3/2007 | Martello | |

(Continued)

OTHER PUBLICATIONS

Office Action for U.S. Appl. No. 15/230,624, dated Feb. 21, 2018, 20 pgs.

(Continued)

*Primary Examiner* — Ana M Vazquez
(74) *Attorney, Agent, or Firm* — Sprinkle IP Law Group

(57) ABSTRACT

Systems and methods for evaporatively cooling air wherein a cooling system enclosure is alternately expandable and contractible. The housing is expandable for operation and contractible for storage or transportation. A water distributor delivers water from a source to evaporative media within the enclosure. Air is circulated over the evaporative media to cool the air. The enclosure may be expanded by creating a positive pressure differential between the interior and exterior of the enclosure. The water distributor and evaporative media may be configured to move from storage to operating positions within the enclosure as the enclosure moves from the contracted position to the expanded position. The enclosure may include substantially rigid portions that form a protective housing for the internal cooling components when in the contracted storage position. Wheels and stowable handles may facilitate transportation of the system.

20 Claims, 4 Drawing Sheets

(56) References Cited

U.S. PATENT DOCUMENTS

| | | | |
|---|---|---|---|
| 7,886,548 B1 * | 2/2011 | Graves | F24F 3/1405 62/93 |
| 9,426,941 B2 * | 8/2016 | Fletcher | A01D 75/00 |
| 10,113,758 B2 | 10/2018 | Eiserer | |
| 10,830,463 B2 | 11/2020 | Eiserer | |
| 2009/0142225 A1 | 6/2009 | Tornqvist | |

OTHER PUBLICATIONS

Office Action for U.S. Appl. No. 16/132,110, dated Apr. 6, 2020, 10 pgs.

* cited by examiner

EVAPORATIVE COOLER

CROSS-REFERENCE TO RELATED APPLICATIONS

This application is a continuation of, and claims a benefit of priority under 35 U.S.C. § 120 from, U.S. patent application Ser. No. 16/132,110, filed Sep. 14, 2018, by Rex A. Eiserer, entitled "EVAPORATIVE COOLER," issued as U.S. Pat. No. 10,830,463, which is a continuation of, and claims a benefit of priority under 35 U.S.C. § 120 from, U.S. patent application Ser. No. 15/230,624, filed Aug. 8, 2016, entitled "EVAPORATIVE COOLER," by Rex A. Eiserer, issued as U.S. Pat. No. 10,113,758, which is a conversion of, and claims the benefit of priority under 35 U.S.C. § 119(e) of U.S. Provisional Patent Application No. 62/256,641, filed Nov. 17, 2015, by Rex A. Eiserer, entitled "EVAPORATIVE COOLER," all of which are incorporated by reference as if set forth herein in their entirety.

BACKGROUND

Field of the Invention

The invention relates generally to evaporative cooling systems and more particularly to evaporative cooling systems having housings that are transformable from a compact storage configuration to a larger operating configuration.

Related Art

Evaporative cooling systems have been available for many years. These systems operate by directing water onto an evaporative cooling medium and directing air over the evaporative cooling medium. As the air flows by or through the evaporative cooling medium, the water in or on the medium evaporates. The evaporation of the water cools the air, which can then be directed into a desired area (e.g., within a dwelling).

Evaporative cooling systems may be used to cool residential or commercial structures. A typical residential evaporative cooling system has a rigid enclosure that is located on the roof of the home. A fan is positioned within the enclosure. The enclosure has one or more sides that are open, except that they are covered by evaporative cooling media such as fibrous pads. A water circulation system pumps water to the top of the pads, where the water is allowed to drip onto the pads and to saturate the pads. When the fan is turned on, air flows into the enclosure through the pads and then flows through a duct into the home. As the air flows through the pads, heat from the air is absorbed by the water, causing the water to evaporate. This cools (and increases the humidity) of the e air in the enclosure in comparison to the air outside the enclosure.

Because evaporative cooling systems are dependent upon the evaporation of water to cool the air, their effectiveness is dependent upon the humidity of the air in the area in which they are used. The more humid the air, the less effective they are at cooling the air. Evaporative cooling systems are, however, advantageous in that they are generally simpler in design and less expensive to install, operate, and maintain than refrigerated cooling systems. Evaporative cooling systems can also be designed to be mobile, and relatively large evaporative cooling systems can be used effectively in temporary or emergency situations, or in large or relatively open areas.

Traditional evaporative cooling systems may be very useful in a number of situations, but they have some drawbacks. One significant disadvantage, particularly with respect to systems that are intended to be transportable, is that they may require a relatively large amount of space during operation and storage. For instance, typical portable evaporative cooling systems have large, rigid shrouds that provide a large area for the cooling medium and funnel the cooled air from the cooling medium to the fan. While it is desirable for the cooling medium to cover more area in order to provide more effective cooling, the larger the cooling area is, the more difficult it is to store and/or transport the system.

It would therefore be desirable to provide evaporative cooling systems that are more easily stored and transported than conventional systems.

SUMMARY OF THE INVENTION

This disclosure is directed to systems and methods for evaporatively cooling air that solve one or more of the problems discussed above. One particular embodiment comprises an evaporative cooling system that has an enclosure which is alternately expandable and contractible. With the housing expanded, the system can be operated to cool air that flows through the system. When the system is not being operated, the housing can be contracted so that the system is more easily stored or transported. In this embodiment, the system includes a water reservoir that is contained within the enclosure. An air inlet enables external air to flow into the interior of the enclosure. An air outlet enables the air to flow out of the enclosure to the exterior of the enclosure. One or more evaporative media are positioned within the enclosure so that air can flow over them. A water distribution subsystem is also positioned within the enclosure to circulate water from the water reservoir to the evaporative media. The water distribution subsystem may include a pump that circulates water from the water reservoir through tubing within the enclosure to the evaporative media. A fan is coupled to the enclosure so that when the fan is operated, it causes air to flow into the enclosure through the air inlet, through the one or more evaporative media and out of the enclosure through the air outlet. As the air flowing over or through the evaporative media, the air is cooled by evaporation of water from the media.

When the enclosure is contracted, the enclosure occupies a first, reduced volume. This makes the system more compact to facilitate transportation and storage of the unit. When the enclosure is expanded, the enclosure occupies a second, greater volume. The evaporative media and the water distribution subsystem in this embodiment are connected to a collapsible support structure within the enclosure so that they are movable from a first, compact position when the enclosure is contracted to a second, operating position when the enclosure is expanded. The enclosure may have one or more substantially rigid shell portions that form a protected volume for the evaporative media and the water distribution subsystem when the enclosure is contracted. The shell portions may include upper and lower shell portions, where the water reservoir is formed in the lower shell portion. The reservoir formed in the lower portion may have a layer of thermal insulation that can be accessed to place ice in the reservoir. The ice may directly cool air that flows over it, and may also cool the water that is distributed to the evaporative media, thereby cooling the air that flows over and around the media. The system may have various additional features. For example, some embodiments may include an ozone generator which is configured to generate ozone in the water that is circulated through the system. The ozone generator may saturate the water with ozone and produce additional ozone that is combined with the air which flows through the enclosure. The ozonated water and/or air can then be circulated through the system to disinfect the housing and evaporative cooling media as well as the air and water themselves.

An alternative embodiment comprises a method for providing evaporative cooling. This method includes providing an evaporative cooler enclosure that is alternately expandable and contractible. This enclosure houses evaporative media and a water distribution subsystem. The enclosure is initially in a contracted position which is suitable for transportation or storage of the system. The various cooling system components that reside within the enclosure may be in compact storage positions. The enclosure is then moved to an expanded position, which causes the evaporative media and the water distribution subsystem to move from their compact storage positions to operating positions. With the system components in the expanded, operating positions, water is circulated through the water distribution subsystem to the evaporative media. Air is circulated through the evaporative media within the enclosure, thereby cooling the air that is circulated through the enclosure. The air may be disinfected by ozonation or other means as it is circulated through the enclosure. This may be accomplished by generating ozone within the water in the system. The air may also be cooled by causing it to flow over ice in the reservoir, or by using ice to cool the water that is distributed to the evaporative cooling media. When the system is no longer needed, circulation of water through the water distribution subsystem and the one or more evaporative media can be discontinued and circulation of air through the enclosure can be stopped. The enclosure and the contained cooling components are then moved from the expanded position to the contracted position.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
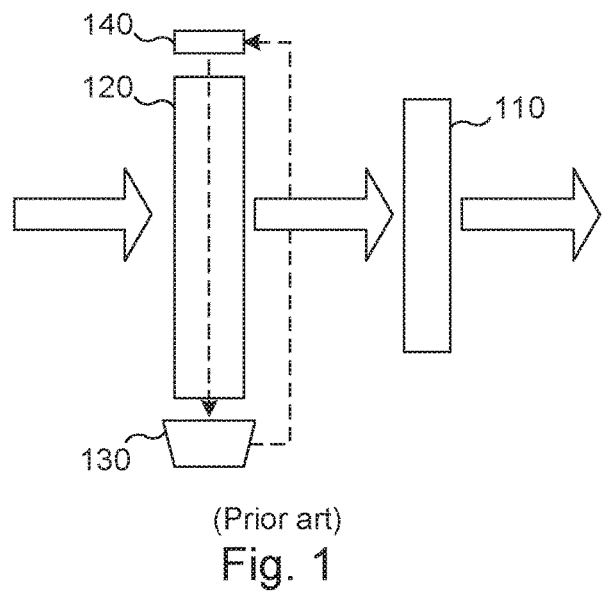
FIG. 1 is a diagram illustrating the principle of operation of evaporative cooling systems.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

One exemplary embodiment of the present invention comprises an evaporative cooling system that has an expandable housing. When the system is not in use, the housing is collapsed to a smaller size so that it is more easily stored or transported. When the system is in use, the housing is expanded to a larger size, opening or expanding air flow pathways through the housing and the evaporative cooling media that are mounted on or in the housing. A water distribution system is provided to deliver water to the evaporative cooling media. A fan is also provided to draw air through the evaporative cooling media.

Referring to FIG. 1, a functional block diagram illustrating the principle of operation of evaporative cooling systems is shown. As depicted in this figure, a fan 110 draws air through an evaporative cooling medium 120. A water circulation system pumps water (as indicated by the dashed line) from a water source such as reservoir 130 to a manifold 140. Water flows out of manifold 140 onto evaporative cooling medium 120. The water moistens the medium and, as the air flows through the medium, the water evaporates and cools the air. Water that is not evaporated continues to flow downward through evaporative cooling medium 120, and is collected in reservoir 130. The collected water is then recirculated to manifold 140, from which it can again flow onto and through evaporative cooling medium 120.

Alternative embodiments may use varying components. For example, in the embodiment above, the fan is driven by an electric motor. The fan's motor may be powered by a battery, a generator or any other means. The fan may alternatively be driven by a combustion engine in other embodiments. The pump of the water distribution system is also driven by an electric motor in this embodiment. The pump motor may be powered by batteries, generators or other means. The water distribution system may alternatively be a non-recirculating system that distributes water from a source such as a garden hose or water storage unit, rather than pumping the water out of a reservoir which collects water that runs off from the evaporative cooling media. In a recirculating water distribution system, the reservoir may be a rigid structure, or it may be a flexible structure, such as a bladder.

Although not explicitly depicted in FIG. 1, the components of the evaporative cooling system are normally mounted to a rigid housing. The housing holds the evaporative cooling medium in position as the fan pulls air through it. The housing also supports the water distribution system so that it is properly positioned to direct the water onto the evaporative cooling medium.

Figure 2:
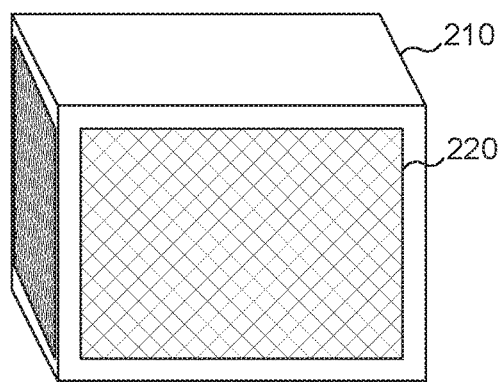
FIG. 2 is a diagram illustrating an exemplary residential rooftop evaporative cooling system having a rigid, substantial cubic housing.

Conventional evaporative cooling systems can be configured in various ways. One of the most common configurations is a residential rooftop installation. An exemplary system is depicted in FIG. 2. This illustration shows the housing 210 of the cooling unit with the evaporative cooling media 220 installed in the outer walls of the housing. Commonly, housing 210 has a simple, quasi-cubic shape and is constructed of stamped sheet metal. The housing typically has openings in either three or four sides, and the evaporative cooling media are installed in the openings. The bottom of the housing forms a reservoir for the water distribution system, and a pump is mounted within the housing to pump water from the reservoir to the tops of the evaporative cooling media. A fan is also mounted within the housing to draw air into the housing through the evaporative cooling media. The fan is coupled to a duct that extends through the rooftop into the building, so air that is drawn into the unit through the evaporative cooling media (thereby cooling it) and then blown into the home through the duct.

Figure 3:
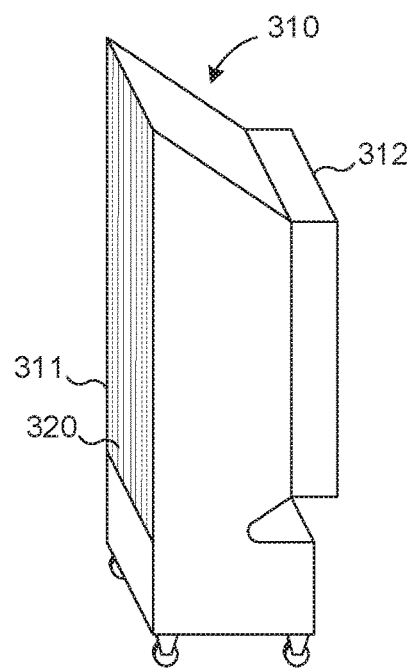
FIG. 3 is a diagram illustrating an exemplary portable evaporative cooling system having a rigid housing.

Another common configuration for a conventional evaporative cooling system is a portable unit. An exemplary portable evaporative cooling system is shown in FIG. 3. In this system, the housing 310 is a large structure that is commonly made of a rigid plastic such as PVC. The housing typically has a single large opening 311 on a first, inflow side of the unit, and a second, smaller opening 312 on the opposite, outflow side of the unit. Inflow opening 311 is typically larger because the evaporative cooling medium 320 is positioned within this opening, and it is desirable to maximize the area of the evaporative cooling medium in order to maximize the cooling effect of the medium. The unit's fan (which is not visible in the figure) is positioned within the second opening 312. The body of the housing typically tapers from the larger opening 311 to the smaller opening. When the fan operates, it pulls air through evaporative cooling medium 320 in opening 311 and blows the air out of opening 312. As with the residential unit, a pump is provided to draw water out of a reservoir which is integrated into the lower portion of the housing and deliver the water to the top of the evaporative cooling medium. The water flows downward through the evaporative cooling medium, and the air flowing through the evaporative cooling medium is cooled by evaporation of the water. Wheels are attached to the housing below the reservoir to allow the unit to be rolled from one location to another.

Figure 4:
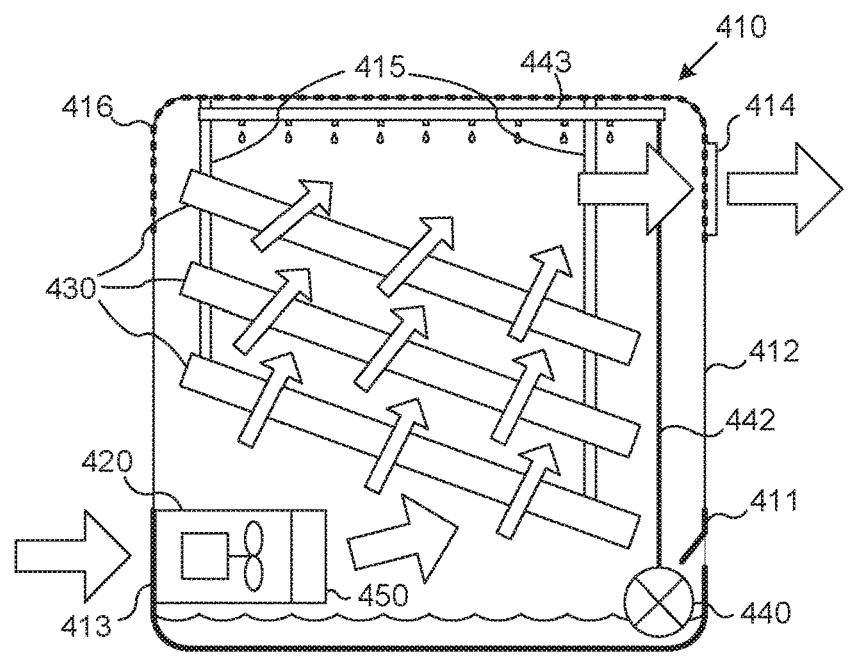
FIG. 4 is a diagram illustrating an exemplary evaporative cooling system having a collapsible/expandable housing in accordance with one embodiment.

Referring to FIG. 4, a diagram illustrating the structure of an exemplary embodiment of the present invention is shown. In this embodiment, an evaporative cooling system 400 includes a housing or enclosure 410, a fan 420, evaporative cooling media 430, and a water distribution system. The primary difference between this embodiment and conventional evaporative cooling systems is that housing 410 is expandable and collapsible, rather than being a rigid structure that does not change its shape. During operation, cooling system 400 is in an expanded position that allows air to flow through pathways within the housing from the inlet to the outlet. These air flow pathways occupy a certain amount of empty volume. In a conventional evaporative cooling system, the rigid, unchanging shape of the housing maintains this empty volume, whether the system is in use or not. In the present systems, the housing can be collapsed when not in use, thereby reducing or eliminating the empty volume within the housing. By reducing or eliminating the empty space in the housing, the overall volume occupied by the system is reduced, which makes the system easier to store and/or transport.

In the embodiment of FIG. 4, housing 410 includes a rigid or semi-rigid lower portion 411 and a flexible upper portion 412. Lower portion 411 may be formed from PVC or other plastics. Lower portion 411 forms a tray or shallow tub that functions as a reservoir for water that flows through the evaporative cooling media. The reservoir formed in the lower portion may have a layer of thermal insulation 417. This tray may also serve as all or part of the shipping and storage container for the system when not in use. In an alternative embodiment, the tray portion of the system may also be flexible (e.g., made of a waterproof fabric) that can be folded or collapsed Upper portion 412 may be constructed from a fabric or similar flexible material. The lower edge of upper portion 412 is connected to the upper edge of lower portion 411. Fan 420 is mounted to the lower portion 411 of the housing at an inlet to the housing. Fan 420 forces air into the housing, generating a positive pressure differential between the interior and exterior of the housing. This positive pressure differential (where the air pressure inside the housing is greater than the air pressure outside the housing) causes the housing to move to its expanded position when the fan is operating. Effectively, the fan inflates the housing. By contrast, conventional evaporative cooling systems typically position the fan at the air outlet so that operation of the fan creates a negative pressure differential that pulls air into the housing. With a negative pressure differential, the housing must be rigid in order to keep it from collapsing. It should be noted that alternative embodiments of the present invention may use a collapsible rigid housing. For instance, the housing may have rigid walls that fold into a collapsed position for storage and transport, or into an expanded position for operation of the cooling system. When a rigid collapsible housing is used, a positive internal pressure differential may not be necessary, and the fan may be positioned at an outlet in the housing.

The embodiment of FIG. 4 includes multiple evaporative cooling media 430. These media may, for example, be fibrous pads or other suitable media. The media are arranged within the housing so that when the housing is in its expanded position, there is space between the media. The media are positioned between the fan at the inlet 413 to the housing and the outlet 414 of the housing so that when the fan is operating, the air is forced through each of the media before exiting the housing. Because the air interacts with multiple media, the maximum cooling effect is achieved (compared to a single media interaction like conventional coolers).

The water circulation system includes a pump 440 that draws water from the reservoir in the lower portion 411 of the housing and pumps this water through one or more tubes 442 to a manifold 443 that delivers the water to evaporative cooling media 430. The water may be sprayed, dripped, or otherwise delivered to the evaporative cooling media. The portion of the water that flows through the media and is not evaporated is collected in the reservoir and is then recirculated. In some alternative embodiments, passive mechanisms may be used to deliver the water to the evaporative cooling media. For example, a wicking mechanism (which uses capillary action to draw the water from the reservoir) may be used, or an inlet fan may create water droplets that are blown onto the evaporative cooling media. In one embodiment, the housing is configured so that, after passing through the evaporative cooling media, the speed of the cooled air is reduced to a level at which water droplets are allowed to fall out of the air before it exits the housing. This prevents the system from producing an undesirable mist, and it also enables the system to provide effective cooling for a longer period of time since more water is retained within the housing.

The media may be hinged or otherwise configured so that when the housing is in the collapsed position, the media are more closely positioned (e.g., stacked on top of each other) and require less space in the housing. In the embodiment of FIG. 4, each of evaporative cooling media 430 is supported by a plurality of straps or cables 415 that extend downward from the top of the housing. When the housing is moved to the collapsed position, the top of the housing moves downward, lowering the straps so that the evaporative media rest on each other within lower portion 411 of housing 410. The components of the water distribution are also configured to move with the expansion and contraction of the housing. In one embodiment, the pump is mounted in a fixed position in the lower portion of the housing and flexible tubing coupled to the pump extends to the top of the housing. A manifold (e.g., perforated tubing that is attached to the top of the housing) receives water from the pump through the flexible tubing and distributes the water across the evaporative cooling media.

It is not unusual for mold growth and bacterial growth to occur in moist environments such as evaporative cooling systems. The present system may therefore incorporate means to prevent mold growth. In one embodiment, an ozone generator 450 is positioned within the housing at the air inlet and/or in the water collection section of the system. When ozone is generated in the air, it flows through the housing and through the evaporative cooling media with the air as it is being cooled. In some embodiments, the water that is circulated through the distribution system and evaporative cooling media is ozonated. In both cases, the ozone in the air and/or the ozonated water is circulated through the system, thereby disinfecting the housing and evaporative cooling media. Other means to combat mold and bacteria may also be used.

The housing may have many different configurations. As described in connection with FIG. 4, the Housing has a rigid lower portion and a flexible fabric upper portion. In one alternative embodiment, the upper portion may comprise several rigid but movable components. For instance, the vertical walls of the housing may be hinged so that they fold together (accordion-style) when the housing is in its compact state. The walls components may alternatively be movable with respect to each other (e.g., telescoping) so that they occupy different positions in the housing's operating and compacted states. In another embodiment, the housing may have rigid upper (416) and lower (411) portions with a flexible intermediate portion connected between them. In this embodiment, when the housing is in its expanded state, the intermediate portion is extended between the upper and lower portions, and when the housing is in its compacted state, the intermediate portion collapses to allow the upper and lower portions to come together to form a suitcase-like shell. Alternatively, the system could employ a collapsible frame that supports the top or body portions of the housing.

Any or all of these embodiments may include features such as wheels and stowable handles on the housing and to facilitate movement or transport of the systems. The housing components may include rigid, semirigid and flexible components in any combination.

Figure 5:
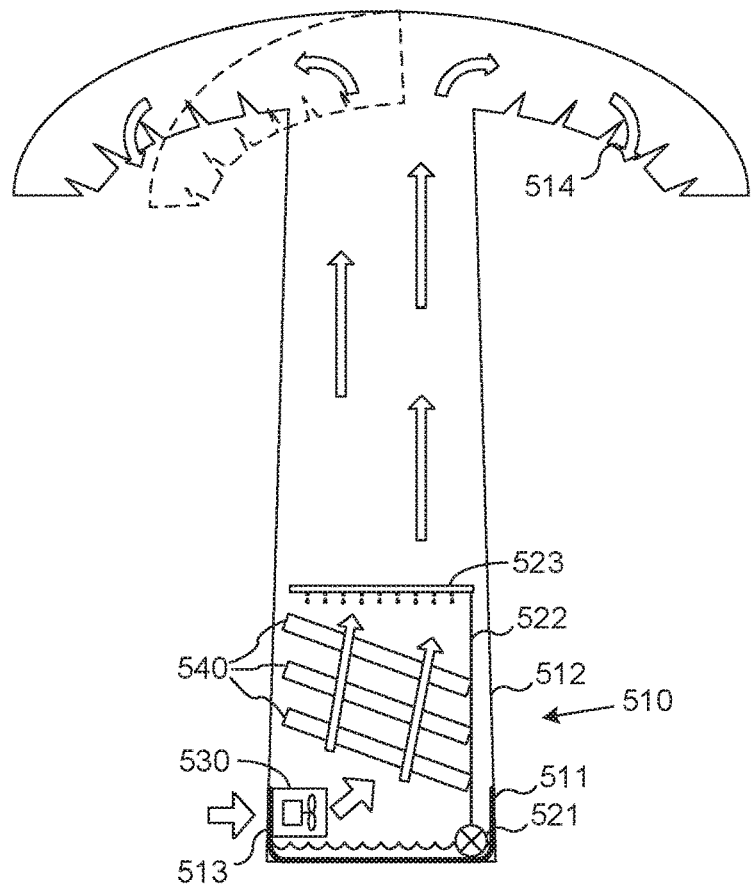
FIG. 5 is a diagram illustrating an exemplary evaporative cooling system having a collapsible/expandable housing in the shape of a palm tree in accordance with one embodiment.

While the housing depicted in FIG. 4 is generally rectangular, alternative embodiments may have many different shapes. In particular, the housing can include a flexible fabric portion that takes on shapes which would not be practical in a conventional system. For example, as depicted in FIG. 5, one embodiment of an evaporative cooling system uses a housing that has the form of a palm tree. In this embodiment, the housing 510 includes a lower portion 511 and an upper portion 512. Lower portion 511 is similar to the lower housing portions described above, in that it is made of a substantially rigid material that forms a reservoir for a water circulation system, and has a pump 521 for the water circulation system mounted to it. A fan 530 is also mounted to lower housing portion 511 at an inlet 513 to force air into housing 510.

The upper portion 512 of the housing in this embodiment is made of a lightweight fabric (e.g., nylon). Upper housing 512 has the shape of a tree (e.g., a palm tree), including a trunk portion that is attached at its lower end to lower housing portion 511, and one or more branch/leaf portions that extend outward from the trunk portion. Several evaporative cooling media 540 are positioned within the trunk portion of the housing. A water distribution tube 522 extends from pump 521 to a water distribution manifold 523 that is positioned at the top of the evaporative cooling media.

When fan 530 is operated, it forces air from inlet 513 into housing 510. The air pressure inside the housing causes the flexible housing to inflate and take on the tree shape. The air that is forced into the housing flows upward through evaporative cooling media 540 and is cooled by evaporation of the water in/on the media. The air continues to flow upward through the trunk portion of the housing and into the branch/leaf portion(s). Air outlets (e.g., 514) are provided in the branch/leaf portions so that the cooled air is distributed to the area around the housing, particularly under the branch/leaf portion of the housing.

When the fan is not being operated, it no longer produces a positive pressure differential between the interior and exterior of the housing, so the upper fabric portion of the housing deflates. It should be noted that the evaporative cooling media 540 and the water distribution system (particularly the tubing and manifold portions) are movably mounted within housing 510 so that they move into a compact position when the upper portion of the housing deflates. This allows the overall volume of the evaporative cooling system to be reduced, making it easier to store and/or transport the system.

Figure 6:
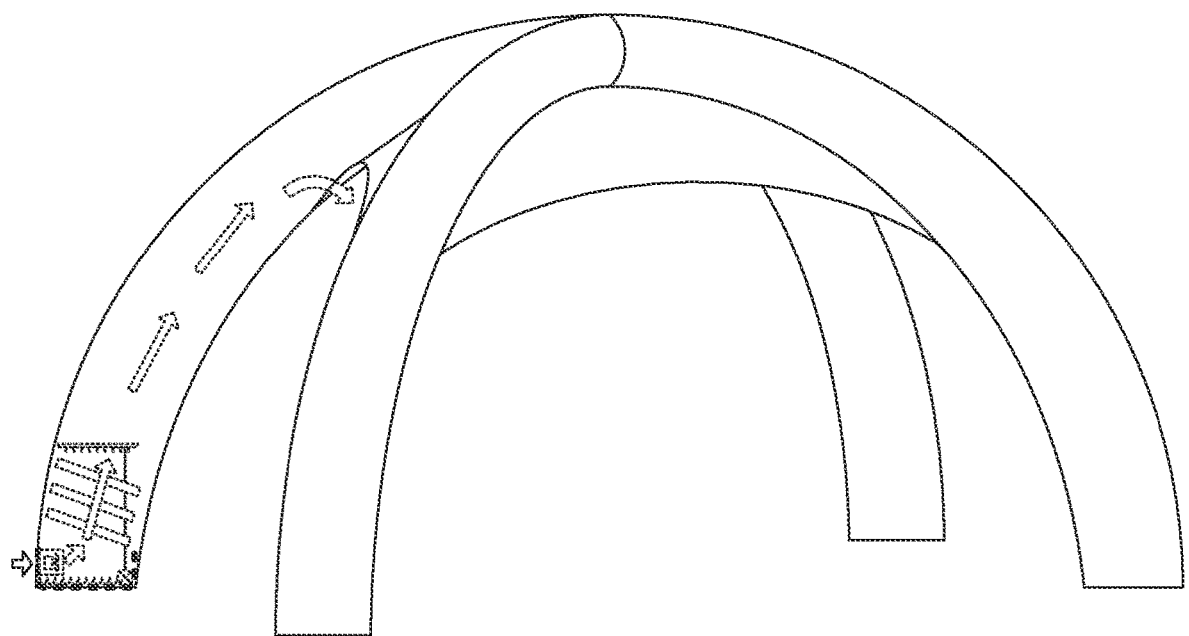
FIG. 6 is a diagram illustrating an exemplary evaporative cooling system having a collapsible/expandable housing that forms an inflatable tent or protective structure in accordance with one embodiment.

Another alternative embodiment is shown in FIG. 6. In this embodiment, an evaporative cooling system includes a housing that forms a tent or other type of shelter when the system is in operation. The housing includes an upper portion made of a flexible (e.g., nylon) fabric that is inflated when the fan of the evaporative cooling system is turned on. Air that is cooled by the system flows out through air outlets (in an upper part of the tent portion so that the cooled air is directed onto the area under the tent. When the fan is turned off, the portion of the housing forming the tent collapses, enabling the convenient storage and/or transportation of the system.

Figure 7:
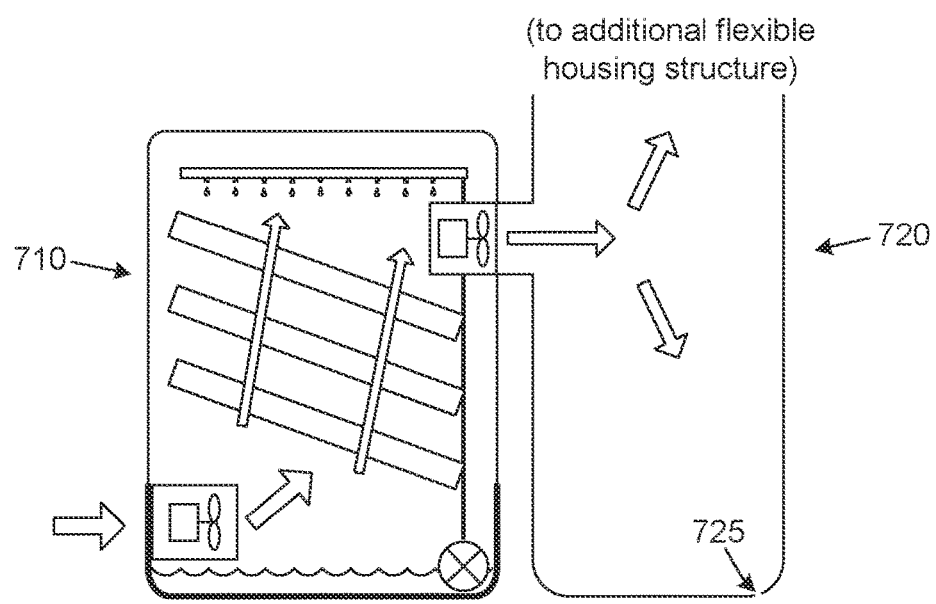
FIG. 7 is a diagram illustrating the connection of a first part of a housing to a second part of the housing, where the first part contains components of an evaporative cooling system and the second part forms an inflatable structure through which cooled air is distributed.

Components of the system such as the fan, air inlet, reservoir, water distribution system, and the like may, for example, be located in the bottom of one of the legs of the tent, similar to the location at the bottom of the trunk portion of the system of FIG. 5. Alternatively, these components may be located in a portion of the housing that forms a separate structure that is adjacent to the flexible portion of the housing and forces cooled air into the flexible portion of the housing. This configuration is illustrated in FIG. 7, which shows the fan, air inlet, reservoir, water distribution system, etc. in a first portion 710 of the housing. The cooled air from portion 710 is forced by the air pressure inside this portion of the housing into the flexible tree/tent portion 720 of the housing. Portion 720 of the housing may include a weep hole 725 to allow mist which collects in this portion of the housing to escape from the housing.

In another alternative embodiment, multiple fans may be used, where at least one of the fans' primary function is to inflate the structure, while at least one of the other fans is used to provide the cooling air to the structure. In yet another alternative embodiment, a conventional inflatable tent or similar structure can be converted to a cooling system by inserting an evaporative cooling element (e.g., evaporative cooling media and water distribution subsystem) between the fan and the inflatable tent structure of the conventional system.

Figure 8:
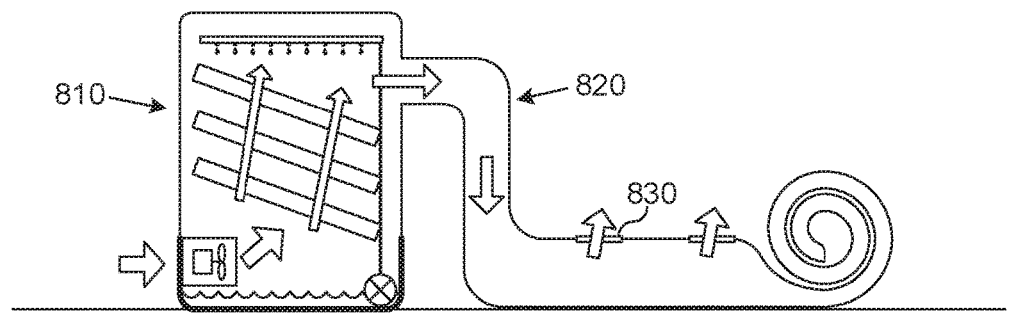
FIG. 8 is a diagram illustrating an exemplary portable evaporative cooling system in which the system's housing is connected to inflatable ducting that unrolls when the system is used and can be rolled up and stored with the evaporative cooling system when not in use.

Referring to FIG. 8, a diagram illustrating an alternative portable evaporative cooling system is shown. In this embodiment, the system's housing 810 is connected to inflatable ducting 820 that unrolls when the system is used and can be rolled up and stored with the evaporative cooling system when not in use. The ducting can be made of a lightweight fabric that takes up very little space when it is rolled up, potentially allowing the ducting to be stored with the evaporative cooling system. The ducting has several outlets 830 along its length that allow the cooled air to be distributed through the duct to a desired area.

Figure 9:
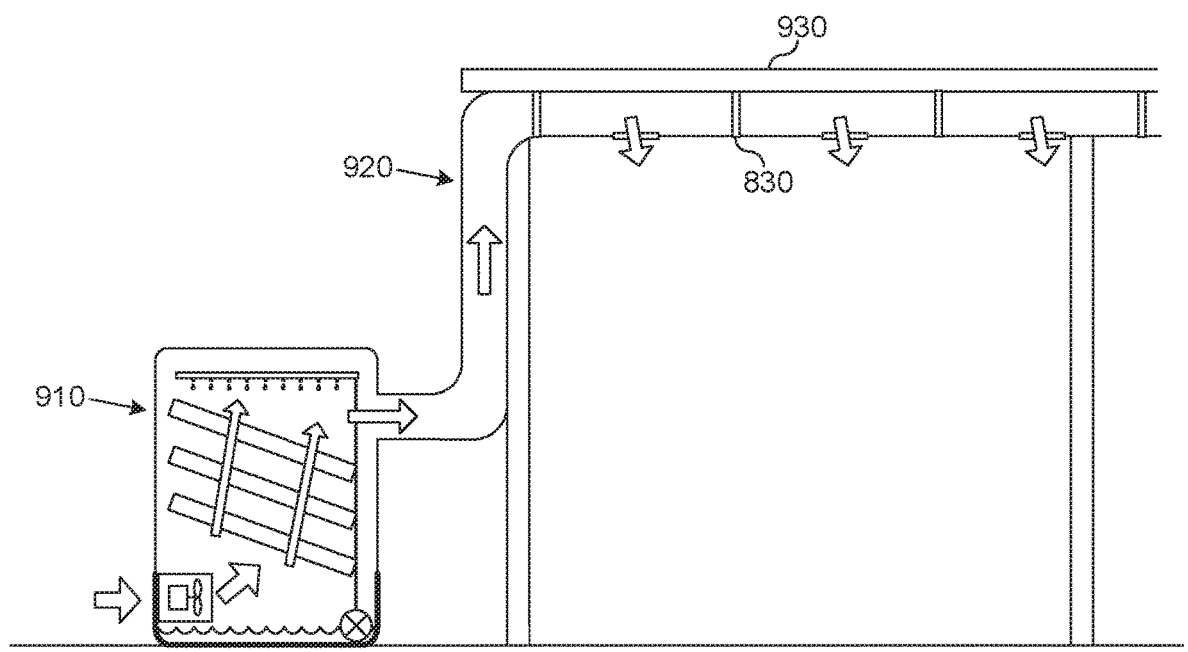
FIG. 9 is a diagram illustrating an exemplary portable evaporative cooling system in which the system's housing is connected to removable/inflatable ducting that can be suspended from a roof or other structure to provide cooled air from above an area such as an outdoor dining patio.

Referring to FIG. 9, a diagram illustrating another alternative embodiment is shown. In this embodiment, a portable evaporative cooling system 910 is connected to removable/inflatable ducting 920 that can be suspended from a roof 930 or other structure. This system provides cooled air from above the desired area without impeding access to the area being cooled, such as an outdoor dining patio. The ducting can be made of a fabric that can easily be supported by straps 940 or other means connected to the roof. The ducting can easily be installed as desired to meet the cooling requirements for the area. When the ducting is not in use, it is deflated and can easily be removed.

As noted above, the housings in embodiments of the present invention can alternately be in a compacted state or an expanded state. For the purposes of this disclosure, terms such as "expanded", "higher volume", "increased-volume", and the like may be used interchangeably to describe the expanded state in which the system operates. The compacted state that the system may be in when it is not operating may be referred to using interchangeable terms including "compacted", compact", "reduced-volume", "lower volume", and the like.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An evaporative cooling system comprising:
   an enclosure having a first portion that is alternately expandable and contractible, wherein when the first portion of the enclosure is contracted, the enclosure occupies a first volume, and when the first portion of the enclosure is expanded, the enclosure occupies a second volume that is greater than the first volume;
   an air inlet that enables air to flow from an exterior of the enclosure to an interior of the enclosure;
   an air outlet that enables air to flow from the interior of the enclosure to the exterior of the enclosure;
   one or more evaporative media positioned within the first portion of the enclosure;
   a water distributor positioned within the enclosure, wherein the water distributor delivers water from a water source to the one or more evaporative media; and
   wherein air from the air inlet is circulated through the one or more evaporative media and thereby cooled by evaporation of water from the one or more evaporative media, and the cooled air is provided at the air outlet.

2. The evaporative cooling system of claim 1, further comprising a fan positioned at the air inlet, the fan configured to draw air into a housing and through the evaporative cooling media.

3. The evaporative cooling system of claim 2, wherein the fan is configured to force air into the enclosure and thereby create a positive pressure differential between the interior of the enclosure and the exterior of the enclosure, thereby expanding the enclosure.

4. The evaporative cooling system of claim 1, wherein when the first portion of the enclosure is contracted, the evaporative media are positioned in compact storage positions, and when the first portion of the enclosure is expanded, the evaporative media are positioned in operating positions which are different from the compact storage positions.

5. The evaporative cooling system of claim 1, wherein when the first portion of the enclosure is contracted, the water distributor is positioned in a compact storage position, and when the first portion of the enclosure is expanded, the water distributor is positioned in an operating position which is different from the compact storage position.

6. The evaporative cooling system of claim 1, wherein the air outlet is connected to an inflatable structure which is configured to be inflated by the cooled air provided at the air outlet, the inflatable structure having one or more additional air outlets that are configured to distribute the cooled air to one or more corresponding areas external to the enclosure.

7. The evaporative cooling system of claim 6, further comprising: a first fan positioned at the air inlet, the first fan configured to draw air into a housing and through the evaporative cooling media; and a second fan positioned at the air outlet, the second fan configured to force air into the inflatable structure and thereby create a positive pressure differential between the interior of the inflatable structure and the exterior of the inflatable structure, thereby inflating the inflatable structure.

8. The evaporative cooling system of claim 6, wherein the inflatable structure comprises an inflatable tent structure, wherein the one or more additional air outlets are provided in an upper part of the tent structure and direct the cooled air onto an area under the tent structure.

9. The evaporative cooling system of claim 6, wherein the inflatable structure further comprises one or more weep holes at a lower portion of the inflatable structure, wherein the weep holes enable mist which collects in the lower portion of the inflatable structure to escape from the inflatable structure.

10. The evaporative cooling system of claim 6, wherein the inflatable structure comprises an inflatable duct having one or more additional air outlets which distribute the cooled air to areas around the inflatable duct.

11. A method for providing evaporative cooling, the method comprising:
providing an evaporative cooler enclosure having a first portion that is alternately expandable and contractible, wherein the first portion of the enclosure houses one or more evaporative media and a water distributor, wherein the enclosure is initially in a contracted position in which the enclosure occupies a first volume;
drawing air into the enclosure through an air inlet and thereby expanding the enclosure to an expanded position in which the enclosure occupies a second volume that is greater than the first volume;
providing water to the water distributor, wherein the water distributor distributes the water to the one or more evaporative media;
circulating the air in the enclosure through the one or more evaporative media, thereby cooling the air; and
providing the cooled air from the enclosure through an air outlet.

12. The method of claim 11, further comprising forcing, by a fan positioned at the air inlet, the air into the enclosure and thereby creating a positive pressure differential between the interior of the enclosure and the exterior of the enclosure, thereby expanding the enclosure.

13. The method of claim 11, further comprising, by expanding the enclosure from the contracted position to the expanded position, moving the evaporative media from compact storage positions to operating positions which are different from the compact storage positions.

14. The method of claim 11, further comprising, by expanding the enclosure from the contracted position to the expanded position, moving the water distributor from a compact storage position to a operating position which is different from the compact storage position.

15. The method of claim 11, wherein the air outlet is connected to an inflatable structure, wherein providing the cooled air from the enclosure through an air outlet comprises circulating the cooled air through the inflatable structure to one or more additional air outlets and distributing the cooled air to one or more corresponding areas external to the enclosure through the one or more additional air outlets.

16. The method of claim 15, further comprising:
drawing, by a first fan positioned at the air inlet, the air into a housing and through the evaporative cooling media; and
forcing, by a second fan positioned at the air outlet, the cooled air into the inflatable structure and thereby creating a positive pressure differential between the interior of the inflatable structure and the exterior of the inflatable structure and inflating the inflatable structure.

17. The method of claim 15, wherein the inflatable structure comprises an inflatable tent structure, wherein the one or more additional air outlets are provided in an upper part of the tent structure, the cooled air directed onto an area under the tent structure.

18. The method of claim 15, wherein the inflatable structure further comprises one or more weep holes at a lower portion of the inflatable structure, the method further comprising collecting mist in the lower portion of the inflatable structure and expelling the collected mist from the inflatable structure through the weep holes.

19. The method of claim 15, wherein the inflatable structure comprises an inflatable duct having one or more additional air outlets, the method further comprising distributing the cooled air through the one or more additional air outlets to areas around the inflatable duct.

20. An evaporative cooling system comprising:
an enclosure having a first portion that is alternately expandable and contractible, wherein when the first portion of the enclosure is contracted, the enclosure occupies a first volume, and when the first portion of the enclosure is expanded, the enclosure occupies a second volume that is greater than the first volume;
an air inlet that enables air to flow from an exterior of the enclosure to an interior of the enclosure;
an air outlet that enables air to flow from the interior of the enclosure to the exterior of the enclosure;
one or more evaporative media positioned within the first portion of the enclosure;
a water distributor, wherein the water distributor delivers water to the one or more evaporative media; and
wherein air from the air inlet is circulated through the one or more evaporative media and thereby cooled by evaporation of water from the one or more evaporative media, and the cooled air is provided at the air outlet.

* * * * *